(12) United States Patent
Bejerano et al.

(10) Patent No.: US 9,185,600 B2
(45) Date of Patent: Nov. 10, 2015

(54) METHODS AND DEVICES FOR PROVIDING ROBUST NOMADIC WIRELESS MESH NETWORKS USING DIRECTIONAL ANTENNAS

(75) Inventors: Yigal Bejerano, Springfield, NJ (US); Qunfeng Dong, Madison, WI (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/276,845

(22) Filed: Oct. 19, 2011

(65) Prior Publication Data
US 2012/0033545 A1 Feb. 9, 2012

Related U.S. Application Data

(63) Continuation of application No. 11/808,413, filed on Jun. 8, 2007, now Pat. No. 8,107,399.

(51) Int. Cl.
| | |
|---|---|
| *H04L 12/28* | (2006.01) |
| *H04W 28/06* | (2009.01) |
| *H04L 12/751* | (2013.01) |
| *H04L 12/721* | (2013.01) |
| *H04L 12/753* | (2013.01) |
| *H04W 28/04* | (2009.01) |
| *H04W 64/00* | (2009.01) |

(52) U.S. Cl.
CPC ............... *H04W 28/06* (2013.01); *H04L 45/02* (2013.01); *H04L 45/26* (2013.01); *H04L 45/48* (2013.01); *H04W 28/04* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 6,583,767 | B1 * | 6/2003 | Fitz ................................ 343/876 |
| 6,757,263 | B1 * | 6/2004 | Olds ............................. 370/315 |
| 7,430,189 | B2 * | 9/2008 | Bejerano et al. .............. 370/332 |
| 8,107,399 | B2 * | 1/2012 | Bejerano et al. .............. 370/255 |
| 2003/0112831 | A1 * | 6/2003 | Williams ....................... 370/535 |
| 2004/0151124 | A1 * | 8/2004 | Hauser et al. .................. 370/252 |
| 2008/0069029 | A1 * | 3/2008 | Chow ............................ 370/328 |
| 2008/0069034 | A1 * | 3/2008 | Buddhikot et al. ............ 370/328 |
| 2008/0304422 | A1 * | 12/2008 | Bejerano et al. .............. 370/252 |
| 2010/0189113 | A1 * | 7/2010 | Csaszar et al. ................ 370/400 |
| 2010/0260070 | A1 * | 10/2010 | Bejerano et al. .............. 370/255 |

FOREIGN PATENT DOCUMENTS

WO  WO 9965162 A1 * 12/1999  ............... H04B 7/08

OTHER PUBLICATIONS

Bettstetter—On the Minimum Node Degree and Connectivity of a Wireless Multihop Network—2002.*
Klein et al.—Approximation Algorithms for Finding Low-Degree Subgraphs—2004.*

(Continued)

*Primary Examiner* — Marsha D Banks Harold
*Assistant Examiner* — Christopher Wyllie
(74) *Attorney, Agent, or Firm* — Capitol Patent & Trademark Law Firm, PLLC

(57) ABSTRACT

The number of directional antennas and associated radios needed to ensure a nomadic wireless mesh network (NWMN) remains operational in the event of node or link failures, while minimizing delay and other unwanted effects, may be determined using novel methods and devices. Such a determination may reduce the number of antennas and radios a service or network provider normally uses, thus reducing its costs.

3 Claims, 2 Drawing Sheets

(56) References Cited

OTHER PUBLICATIONS

Kuhn et al.—Unit Disk Graph Approximation—2004.*
Philip N. Klein et al., "Approximation algorithms for finding low-degree subgraphs", Networks 44 (3), Aug. 12, 2004: 203-215; XP002498097 online, Chapters 3-5.*
Weili Wu et al., "Minimum connected dominating sets and maximal independent sets in unit disk graphs", Theoretical Computer Science 352 (1), Mar. 1, 2006: 1-7.*
Weili Wu et al., "Minimum connected dominating sets and maximal independent sets in unit disk graphs", Theoretical Computer Science 352 (1), Mar. 1, 2006: 1-7; XP002498098.

* cited by examiner

A Backlink →

METHODS AND DEVICES FOR PROVIDING ROBUST NOMADIC WIRELESS MESH NETWORKS USING DIRECTIONAL ANTENNAS

RELATED APPLICATION

The present application is a continuation of U.S. patent application Ser. No. 11/808,413 filed Jun. 8, 2007 now U.S. Pat. No. 8,107,399 the disclosure of which is incorporated in full herein as if set forth in full herein.

BACKGROUND OF THE INVENTION

Wireless mesh networks have been widely recognized as an emerging technology for low-cost, fast deployment communication networks. Nowadays, they are used in numerous applications, such as wireless backhaul, public safety, and public Internet access. In these applications some wireless routers, referred to as nodes, are statically (i.e., fixed) deployed at different locations. Each node is typically equipped with multiple mesh radios to form a connected mesh. Besides the mesh radios, each node may also have other wireless interfaces that are used to form wireless local area networks (WLANs) for client access. Some of the wireless routers, termed gateways, are connected to the Internet through additional network interfaces. Thus, wireless mesh networks can be used for both local communication and Internet access.

To improve network performance, several equipment vendors connect mesh radios to directional antennas, referred to as directional mesh radios. Directional antennas have a number of technical advantages over conventional omni-directional antennas, including extended transmission range, low interference, low transmission power, and so on, which make them very attractive for static and quasi-static (i.e., limited movement) environments. To simplify network deployment, some vendors utilize a point-to-point paradigm. In particular, each directional mesh radio is paired with another directional mesh radio installed on another node within reach (i.e., neighbors are paired) to form a point-to-point connection between them. To form the connection the two directional mesh radios must be properly oriented toward each other and assigned to the same wireless channel. Directional mesh radios on different links are assigned to orthogonal channels to avoid interference.

Recently, wireless mesh technologies have been used for fast deployment of disaster recovery networks and for military applications. In these applications, wireless mesh routers are mounted on top of moving vehicles or ships. Nodes within such networks/applications are required to identify their neighbors and establish point-to-point connections with some of them to form a robust, connected network regardless of the location of the node(s). We refer to these networks as nomadic wireless mesh networks (NWMN). Unlike ad-hoc networks that provide limited communication capabilities between dynamically moving nodes, NWMNs are required to provide broadband and reliable communications using wireless mesh routers with quasi-static mobility patterns, i.e., a node may change its location but it tends to stay in the same place for a long duration. For such applications, directional mesh radios can be efficiently utilized to establish high capacity point-to-point connections, without suffering from the typical problems of dynamic directional antenna-based environments, such as deafness and hidden nodes.

In some environments/applications (e.g., military) it is important that NWMNs be able to withstand the failure of a link or node. Said another way, it is desirable to provide for dynamic, fault resilient wireless mesh networks. More specifically, it is desirable to provide a robust wireless backbone made up of nodes consisting of wireless mesh routers that (i.e., referred to as "two-edge-connected or two-node-connected" by those skilled in the art) are connected using point-to-point connections between adjacent routers/nodes. In such a resilient network, even if a link or node becomes temporarily unavailable the entire network must remain connected.

Providing robust and resilient NWMNs has its own set of challenges, including determining the types of topologies (e.g., number of nodes, number of directional antennas per node) that assure an NWMN remains operational after suffering a node or link failure.

As is known in the art, determining the topology of a network is a very complex problem. More specifically, such problems are characterized as being "NP-hard" meaning their solutions cannot be found within a reasonable amount of time (i.e., it may take an infinite amount of time to solve them). To determine those topologies of a multi-node wireless mesh network that will remain operational even after a link or node failure, we may turn to mathematics for some guidance. In mathematical terms, a similar problem to the one we face is finding minimum degree spanning subgraphs, i.e. trees or two-connected subgraphs, which is known to be NP-hard for general graphs. Though some have found solutions to this NP-hard problem, none of the solutions can be satisfactorily used to construct robust and resilient NWMNs.

Most researchers that have come before the present inventors have solved so-called "minimum degree spanning subgraph problems" which seek to minimize the degree of a given graph. In contrast, in order to satisfactorily apply the results from a mathematical analysis to our goal of providing robust and resilient NWMNs, solutions to so-called "two-connected subgraphs with bounded node degree problems" must be found. In providing solutions to these problems, the topology of a full graph is not the focus as it is in the minimum degree type problems.

Because a node in a NWMN may only establish point-to-point connections with nodes in its transmission range, a topology model may be modeled by using a so-called "unit disk graph" (UDG).

In brief, a UDG has the following attributes and characteristics. Assuming the use of identical mesh nodes with the same transmission range in all directions, a candidate link exists between two nodes in a full graph if and only if they are within a given distance R from each other. This is a commonly used model for wireless networks and, especially, it is a reasonable model for naval applications, which is one of the applications of NWMNs. In these cases, there are no obstacles between nodes. Two nodes can communicate if their distance does not exceed their transmission range R. In the inventions described below, only high capacity point-to-point connections are used. Thus, we assume that R is selected accordingly.

In terms of UDG graphs, it is highly desirable to provide techniques for calculating bounded degree subgraphs that can, thereafter, be used to construct robust and resilient NWMNs. Said another way, currently, the number of directional antennas and associated mesh radios (collectively referred to as "antenna" or "antennas" because there is usually a one-to-one correspondence between radios and antennas, i.e., one antenna per radio) installed on each node in an NWMN is chosen in a somewhat arbitrary manner. Therefore, it is highly desirable to provide for methods that enable network operators and the like to more definitively determine the number of antennas needed per node.

SUMMARY OF THE INVENTION

Figure 1:
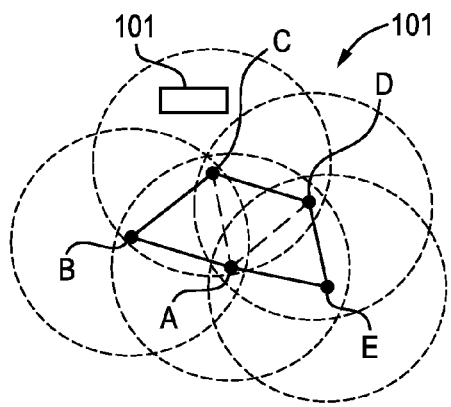
FIG. 1 depicts an example of a bounded degree robust network.

The inventors believe that the discussion which follows (summarized somewhat above) will provide network operators and the like with guidance on the number of directional antennas that should be installed on each node in order to build and maintain robust, resilient and efficient NWMN mesh networks.

Several processes or algorithms for calculating bounded degree subgraphs have been designed for use with UDGs. Each has its own drawbacks, however. To the best of the inventors' knowledge, the inventors are the first to present solutions to the problems of finding bounded degree two-connected subgraphs of UDGs, which are known to be NP-hard, which can be applied to ensure robust and resilient NWMNs.

In accordance with the present invention the inventors recognized that to assure a NWMN operates after loosing a link or node may require, in some instances, a minimum of 10 (two-edge-connectivity) or 5 (two-node-connectivity) directional antennas be connected to each node. In terms used by those skilled in the art, the term "degree" is sometimes used in place of directional antenna though the two words are not exactly synonymous (see explanation below). Thus, it can be said that the inventors discovered that to ensure "two-edge-connectivity" and "two-node-connectivity" the graph degree may have to be at least 10 and 5 in some instances.

In accordance with additional embodiments of the invention, the inventors discovered relatively straightforward methods to determine NWMN topologies that use the minimal number of directional antennas per node (so-called "guaranteed low bound on node degree").

In one embodiment of the invention, one method provided by the inventive includes nodes that are just a few hops away from their closest gateway so that Internet-bound traffic can be routed efficiently to ensure high network capacity and reduce delay and packet loss rate.

In accordance with the present invention the inventors discovered two methods for finding subgraphs that ensure two-edge-connectivity and two-node connectivity, respectively (i.e., subgraphs that can be used to determine the number of directional antennas needed per node).

In addition to discovering the two methods just mentioned, the present inventors also discovered a "link augmentation" method that reduces the "hop-count" distance of nodes to gateways, while preserving subgraph degree bound and connectivity properties. This method efficiently handles both single-gateway and multi-gateway scenarios. In the case of multiple gateways, the constructed subgraph ensures two node/edge-disjoint paths from every node to two distinct gateways, while preserving the degree bound (e.g., the maximum number of point-to-point links bounded by the number of directional antennas per node).

In more detail, the present invention sets forth a number of exemplary methods, including: a method for computing the topology of a wireless mesh network to preserve network connectivity comprising: (a) computing a DFS tree from a unit disk subgraph representing nodes in the network; (b) identifying nested backlinks in the computed tree; (c) iteratively removing nested backlinks from the tree until there are none remaining, wherein the links that remain preserve network connectivity in case of a link failure; (d) performing a backlink shifting operation on some of the links to further remove links; and (e) performing a tree-edge removal operation on some links to further remove links, wherein the links that remain after the backlink shifting and tree-edge removal operations preserve network connectivity in case of a node or link failure. This first method can be augmented by the further step of: (f) iteratively adding links to minimize an average hop count distance while preventing an increase in the maximal node degree.

In addition to the exemplary method just mentioned, the present invention also includes another exemplary method as well, namely: a method for computing the topology of a wireless mesh network to ensure the network remains operational during a link or node failure comprising: (a) computing a graph representing nodes in the network; (b) iteratively removing some links from the graph such that the links that remain ensure that the operation of the network will be maintained in the event of a link failure; (c) performing a backlink shifting operation on some of the links to further remove links; and (d) performing a tree-edge removal operation on some links to further remove links, wherein the links that remain after the backlink shifting and tree-edge removal operations ensure that the operation of the network will be maintained in the event of a node or link failure. As with the first exemplary method, this method may also be augmented by (e) iteratively adding links to improve a network's performance.

Each of the exemplary methods may be executed by a number of different devices, one such device being a central or network controller or the like. In addition, once the number of antennas per node is determined, the present invention also provides for a plurality of quasi-static routers (i.e., nodes) in the network, wherein each router is connected to: (1) at least ten directional antennas to preserve network connectivity in the event of a link failure or (2) at least six directional antennas to preserve network connectivity in the event of a node or link failure.

DETAILED DESCRIPTION OF THE INVENTION

The discussion above and below sets forth discoveries made by the present inventors, discoveries that can be used to construct robust and resilient NWMNs. As set forth above and explained in more detail below, the inventors discovered that the minimal number of directional antennas attached to each node needed to ensure two-edge connectivity (i.e., when a link fails) is at least 10, and the minimal number of directional mesh radios attached to each node needed to ensure two-node connectivity (when a node or link fails) is at least 5 or 6, respectively, assuming the nodes can be modeled as a UDG full graph.

Before continuing, we first present some additional models, definitions, notations, and formulations in the hope that it will aid the reader in understanding the discoveries made by the present inventors.

To begin, in the network topologies considered by the inventors, it was assumed that each router is identical, and, therefore, each has the same number of directional mesh radios, denoted by K, which may be referred to (in graph theory parlance) as the maximal node degree of the graph or simply as the graph degree. In determining the number of directional antennas needed to ensure robust and resilient NWMNs, the inventors began by considering a full graph comprised of all the candidate links between every pair of adjacent nodes that may establish a point-to-point communication link with an adequate channel quality. Because the maximal node degree of the full graph may be higher than K, the inventors objective was to find a robust (i.e., 2-node/edge connected) sub-graph of the full graph with a maximal node degree at most K. For example, consider the simplified network 100 in FIG. 1, where the transmission range of each node A-E, for the purpose of illustration, is represented by the disk centered at that node. Assume each node is equipped with K=2 directional mesh radios and our objective is to build a strongly connected mesh topology. Although node A is adjacent to all four of the other nodes B-E, in one example of a mesh topology (represented by the solid lines) provided by the present invention, node A only maintains point-to-point connections with two of its neighbors.

As indicated above, the wireless mesh networks (e.g., network 100) considered herein are NWMNs made up of wireless routers at nodes (or as nodes) which may be deployed on movable nodes, such as ships or vehicles, to give just some examples of how they may be deployed. Each wireless router in an NWMN is equipped with K+1 mesh radios, with K of them attached to directional antennas used to establish point-to-point data connections with adjacent nodes. The last mesh radio is attached to an omni-directional antenna and is used for management proposes. Each time a node changes its location, the router instructs the mesh radio that utilizes the omni-directional antenna to discover adjacent routers. It then sends this information to a decision point, such as a controller, responsible for updating and maintaining the NWMN's present topology. An NWMN, such as NWMN 100, may have one or more controllers 101 (see FIG. 1). Each controller executes topology selection methods/processes and then updates nodes in the NWMN in order to provide the nodes with available point-to-point connections. To make FIG. 1 less cluttered, the wireless or wired connections between the controller(s) 101 and the nodes A-E have been omitted. In one example of the present invention, the methods discovered by the inventors may be executed by such controllers in optional conjunction with additional or on-board memory.

In graph analysis parlance, we can denote by $F(V,E_F)$ the full graph that represents all the possible point-to-point connections, where the set of nodes V denotes the wireless routers and the set of edges $E_F$ specifies all the possible point-to-point connections. For every node $v \in V$ we denote by $N_v$ the set of nodes adjacent to it, including v itself where, in the full graph $F(V,E_F)$, the degree of a node may be more than K, i.e., $N_v$ may be more than K+1.

In graph analysis, the full graph $F(V,E_F)$ may be used to find a subgraph $G(V,E)$ of $F(V,E_F)$, such that in $E \subseteq E_F$, the degree of any node in G is at most K and G still satisfies some connectivity requirements. In particular, the inventors discovered methods for finding subgraphs that satisfy the following connectivity requirements: two-edge-connectivity which guarantees two, edge-disjoint paths between every pair of nodes, and two-node-connectivity that provides two, node-disjoint paths between every pair of nodes.

Initially, the inventors formulated a "problem statement" that had as its goal the discovery of an NWNM topology that was robust and resilient. The formulation of the problem, and its solution, involved complex mathematical proofs. In brief, the inventors' objectives can be written as follows.

(Bounded Degree Two-Edge Connectivity)
Given a two-edge-connected full graph $F(V,E_F)$, find a minimal integer $K_{2EC}$ and a polynomial-time algorithm that finds a two-edge-connected subgraph $G(V,E)$ with maximal node degree no larger than $K_{2EC}$.

(Bounded Degree Two-Node Connectivity)
Given a two-node-connected full graph $F(V,E_F)$, find a minimal integer $K_{2NC}$ and a polynomial-time algorithm that finds a two-node-connected subgraph $G(V,E)$ with maximal node degree no larger than $K_{2NC}$.

For some full graph topologies there are subgraphs with degree as low as 2 that preserve the connectivity requirements, i.e., when the full graph contains a Hamiltonian cycle. However, the inventors objective was to find two minimal constants $K_{2EC}$ and $K_{2NC}$ that ensure the existence of two edge/node connected subgraphs with upper degree bounds of $K_{2EC}$ and $K_{2NC}$, respectively, regardless of the full graph topology. In the case of an arbitrary full graph, the required number of directional antennas may be as high as the number of the graph nodes minus 2. Thus, just for the analysis of the degree bound (i.e., to determine the number of antennas) we assume the use of identical mesh nodes with the same transmission range R in all directions. Further, the inventors modeled a full graph as a UDG. More specifically, nodes in a NWNM are considered as points in the plane, where two nodes are considered adjacent if and only if the (Euclidean) distance between them is at most R, where R is taken as the unit distance.

We now discuss how to determine the lower bounds that are associated with the upper bounds $K_{2EC}$ and $K_{2NC}$. These upper bounds are based on the following fundamental property of UDGs known by those skilled in the art.

Property 1 Consider any node u of any given UDG and let $G(V,E)$ be the subgraph induced by u, all its neighbors and the edges between them. Then, the maximum independent set of G has at most 5 nodes, i.e., any subset of V of size 6 or more contains neighboring nodes.

Figure 2A:
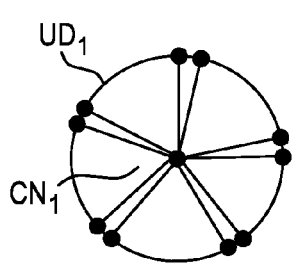
FIGS. 2(a) and (b) depict graphs that can be used to represent the minimal number of directional antennas needed to preserve connectivity in a robust and resilient NWNM for two different connectivity requirements.

By using Property 1, we illustrate in FIGS. 2(a) and (b) that the lower bounds on $K_{2EC}$ and $K_{2NC}$ in UDGs are 10 and 5, respectively. FIG. 2(a) demonstrates that at least degree 10 (e.g., 10 antennas) is needed for preserving two-edge-connectivity of some UDGs. In this example, 5 node pairs are evenly placed along the fringe of the unit disk $UD_1$ which is centered around central node $CN_1$. In FIG. 2(a), every node is adjacent to its peer node and the central node but not adjacent to any other node. To provide two-edge-connectivity, the central node has to be connected to the other 10 nodes, resulting in a degree of 10 on the central node.

Figure 2B:
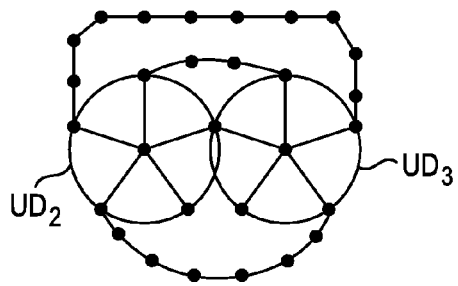

FIG. 2(b) shows that at least degree 5 (e.g., 5 antennas) is required to maintain two-node-connectivity of the graph shown. Again, the 5 nodes along the fringe of each unit disk, $UD_2$, $UD_3$, are even distributed. Two nodes are connected if and only if their Euclidean distance is at most 1. The central nodes of the unit disks $UD_2$, $UD_3$ both have degree 5. In this example, the removal of any link results in a subgraph that is not two-node connected.

Having presented a problem statement and examples of both a two-edge connected and two-node connected NWNM, we now turn our discussion to an explanation of the methods discovered by the inventors which were used to determine the minimal number of antennas needed in both a two-edge and two-node connected based NWNM.

In accordance with the present invention, the first step is to build two-connected sparse subgraphs. To this end the inventors discovered two methods of doing so. The first, referred to as a simple Backlink-Based Algorithm ("BBA") builds a subgraph G that preserves the two-connectivity of an original full graph (either two-edge-connectivity or two-node-connectivity) from which the subgraph is selected. If the full graph is a UDG, the maximal node degree of the subgraph G is at most 10 (e.g., 10 directional antennas). As we have discussed before, this is the minimal node degree that is required to maintain the two-edge-connectivity of UDGs (i.e., maintain an operational network when a link failure occurs).

The second method applies to two-node-connected full graphs only (i.e., node or link failures). In accordance with another embodiment of the invention a "Backlink Shifting" and "Tree Edge Removal" algorithm method (SRA for simplicity) is presented. The SRA method may be used to post-process the two-node-connected subgraph(s) calculated by BBA. The resulting subgraph G is still two-node-connected, and if the full graph is a UDG, the maximal node degree of the resulting subgraph G is at most 6 (e.g., at most six directional antennas are needed).

In yet a further embodiment of the invention, after executing either the BBA or SRA methods the present invention further provides for the augmentation of a calculated subgraph with additional links for reducing the hop-count distance (e.g., the number of hops between a gateway and any other node) of the nodes to the gateways, while preserving the degree bound and connectivity property (maintaining an operational network during a link or node failure).

We begin with a discussion of the BBA method. We start with the following key property discovered by the inventors (referred to as a "Lemma") of DFS trees that is important to the design of the BBA and SRA methods.

Lemma 1 If two nodes u and v are adjacent in a full graph, then in any DFS tree of the full graph, either u is v's ancestor or vice versa.

The inventors developed detailed proofs in support of Lemma 1. For the sake of simplicity these proofs have been omitted in order to make the discussion herein more understandable, it being understood that the proofs are not necessary to those skilled in the art to understand and practice the inventive methods and devices discussed herein.

The discovery of the property embodied in Lemma 1 lead to the discovery of a corollary, namely:

Corollary 1 The children of each node form an independent set, which contains at most 5 nodes in UDGs. Therefore, the degree of any DFS tree is at most 6.

We now set forth two definitions that are needed to understand the BBA and SRA methods.

Definition 1 (Backlink) Let T be a DFS tree of the full graph $F(V,E_F)$. We refer to each edge (u, v) ∈ $E_F$ such that (u, v)∉T as a backlink of T. By Lemma 1, u is either an ancestor or a descendant of v in T. We refer to u as a backlink neighbor of v, and vice versa.

Definition 2 (Nested Backlink) Consider a backlink (u, v) of T, where u is an ancestor of v. We refer to (u, v) as a nested backlink if there is another backlink (ú, v́) of T, where ú is an ancestor of v́, such that (1) Either u=ú or ú is an ancestor of u in T. (2) Either v=v́ or v́ is a descendant of v in T.

The BBA method is an iterative method that starts with an initial subgraph G that is identical (same number of nodes and links) to an associated full graph. Then, the BBA method calculates a DFS tree T, a subgraph of a full graph, and then iteratively removes a nested backlink of T from the residual graph G until G does not contain any nested backlink of T.

Figure 3A:
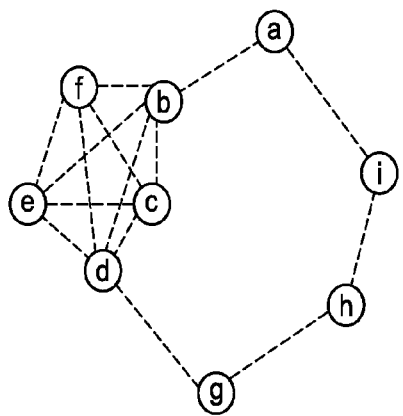
FIG. 3(a) depicts a full graph (i.e., a graph that represents the possible connections in a network).
Figure 3B:
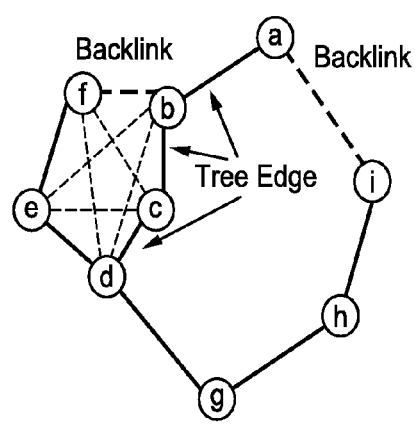
FIG. 3(b) depicts an example a subgraph generated by an exemplary method of the present invention from the full graph depicted in FIG. 3(a).

FIG. 3(b) illustrates an example a subgraph calculated by the BBA method from the full graph depicted in FIG. 3(a). In FIGS. 3(a) and (b), the tree links are denoted by solid bold lines while backlinks are denoted by dashed bold lines. In this example, the links (c, e), (c, f), (d, b), (d, f) and (e, b) are nested links by the link (f, b) and have been removed from the calculated subgraph.

In accordance with the present invention, the inventors discovered that, when the full graph is a UDG, the BBA method generates a two-node/edge connected subgraph with node degree at most 10 (e.g., at least 10 directional antennas are needed to maintain a NWNM operational in the event of a failure). Again, although the inventors also discovered the proofs underlying these discoveries they have been omitted for the sake of brevity, it being again understood that these proofs are not necessary for an understanding of the present invention. That said, briefly it can be said that these proofs comprised of the following two steps. First, the inventors proved that it is sufficient to keep only non-nested backlinks to preserve the two-connectivity property of a graph (e.g., to maintain an operational NWNM in the event of a node or link failure). Second, the inventors proved the degree bound, that is, they proved that the set of backlink neighbors of any node v and its parent yield an independent set with at most 5 nodes, using Property 1. In addition, from Corollary 1 the inventors proved that a node may have at most 5 children, thus a node degree is bounded by 10.

Further, included in these proofs the inventors discovered that if a subgraph G is initially two-edge-connected/two-node-connected, then after removing a nested backlink, the resulting subgraph G is also two-edge-connected/two-node-connected. Thus, the final subgraph G obtained by removing nested backlinks is two-edge-connected/two-node-connected as well.

In accordance with another embodiment of the invention, compared with the BBA method, the SRA method further reduces node degree (e.g., the number of antennas needed) by making the children and backlink neighbors of each node form an independent set in the resulting subgraph. In particular, the SRA method comprises three steps. In the first, it calculates a DFS tree and obtains a two-node-connected subgraph Ǵ(V,E), using the BBA method. In the second step, a top-down (or vice-versa) visit of the DFS tree nodes is completed as well as a Backlink Shifting operation on some nodes. In the third step, a bottom-up (or vice-versa) visit of the DFS tree nodes is performed along with a Tree Edge Removal operation on some links/nodes to remove, for example, additional links. These operations may reduce the degree of links/nodes in Ǵ. Throughout the entire degree reduction process in the second and third round, the SRA method always preserves the following two Reservations:

I. Ǵ does not contain any nested backlink.
II. Ǵ is a two-node-connected subgraph that connects all the nodes in V.

Essentially, during the top-down and the bottom-up processes the degree of a node v is reduced if its combined set (of children and backlink neighbors) in the subgraph Ǵ is not an independent set. It follows then that (see discussion that follows) if Ǵ is two-node connected then the degree of the root node is at most 6. Thus, in the following degree reduction operations are performed only for non-root nodes.

Consider a non-root node v with degree higher than 6. The children of v form an independent set and the backlink neighbors of v form an independent set as well. Thus, it has to be the case that v has a child w and a backlink neighbor b in Ǵ such that b is adjacent to w in Ǵ. Since b is adjacent to w, by Lemma 1, b must be a descendant of both w and v in T. Let us assume that b resides in the subtree $T_{x1}$ rooted at some child $x_1$ of w in T. We distinguish between two cases.

Figure 4A:
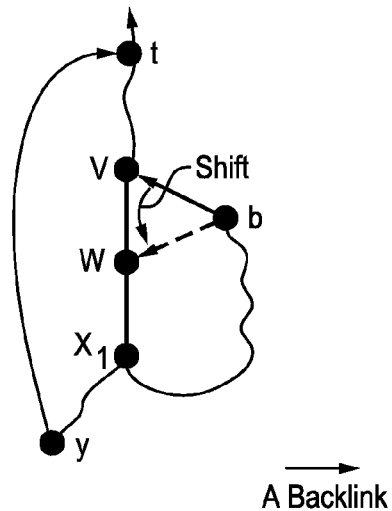
FIGS. 4(a) and (b) depict examples of how the number of nodes in an NWMN may be reduced using exemplary methods provided by the present invention.

Case 1 (Backlink Shifting): Let's assume that Ǵ contains at least one backlink between some node y in $T_{x1}$ and some ancestor t of v, as illustrated in FIG. 4(a). Thus, the nodes v, w and $x_1$ are included in two cycles. The first cycle contains the nodes {v, w, $x_1$, y; t}, while the second cycle contains the nodes {v, w; $x_1$, b}. Consequently, the nodes included in these cycles induce a two node connected component. In this case, we reduce the degree of node v during the top-down process by replacing (v, b) with (w, b), referred to as Backlink Shifting operation. After this operation the node v is included in just in the first cycle but w and $x_1$ are still included in both cycles. Thus, after the backlink shifting operation the nodes in the two cycles still induce a two node connected component. In accordance with the present invention, the inventors developed proofs (omitted herein) that this is sufficient to preserve the two-node-connectivity of Ǵ. Finally, if (w, b) is nested, we remove it to preserve Reservation I.

Figure 4B:
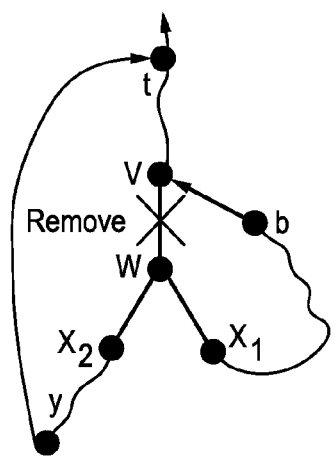

Case 2 (Tree Edge Removal): Unlike case 1, lets assume that Ǵ does not contain a backlink between a node in $T_{x1}$ and any ancestor of v. Since, Ǵ is two-node connected, node w is not a cut node. Thus, node w must have another child $x_2$ such that Ǵ contains at least one backlink between some node y in $T_{x2}$ and some ancestor t of v, as illustrated in FIG. 4(b). Recall that Ǵ contains two cycles. The first cycle $C_1$ contains the nodes {v, w, $x_1$, b}, while the second cycle $C_2$ contains the nodes {t, v, w, $x_2$, y}. The two cycles share only the nodes (v, w) and the edge between them. Consequently, Ǵ contains a "big" cycle C that comprises all the edges of $C_1$ and $C_2$ beside the edge (v, w). We reduce the degree of node v during the bottom-up process by removing (v, w), referred to as Tree Edge Removal operation. This operation preserves the cycle C and thus all the nodes in the cycles $C_1$ and $C_2$ still included in a two-node connected component. Further, this is sufficient to preserve the two-node-connectivity of Ǵ (proofs have been omitted).

In an alternative embodiment of the invention, instead of performing the Backlink Shifting and the Tree Edge Removal operations separately they may be completed at the same time. However, to simplify the explanation herein these operations may be viewed as being performed separately.

Figure 5A:
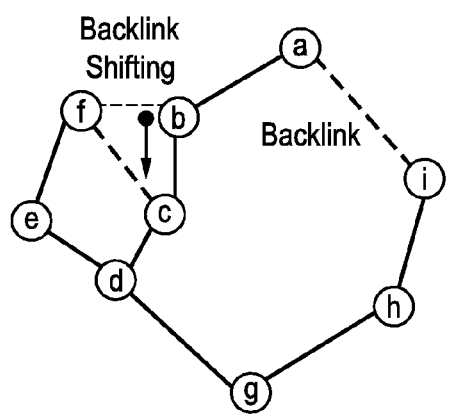
FIGS. 5(a) and (b) depict the use of another exemplary method provided by the present invention.
Figure 5B:
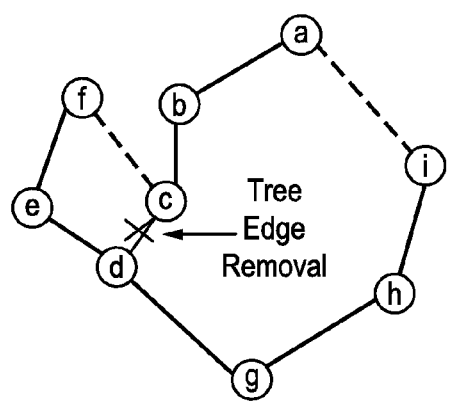

At the end of the third step, the children and the backlink neighbors of every (non-root) node produce an independent set. Thus, the graph degree is at most 6 (i.e., number of antennas is at most 6). FIGS. 5(a) and 5(b) depict the Backlink Shifting and Tree-Edge Removal operations, respectively, using the graph Ǵ in FIG. 3(b). In this example the SRA method reduces the subgraph degree from 3 to 2.

In developing the SRA method, the inventors discovered and proved (proofs omitted for the reasons set forth above) a number of properties which are summarily stated as follows:

Lemma 4 The backlink shifting operation preserves the two-node-connectivity of Ǵ.

Lemma 5 After removing (v,w), Ǵ contains a path $P_1$ from $x_1$ to w and a path $P_2$ from $x_1$ to v such that $P_1$ and $P_2$ are node-disjoint and contain only nodes in $T_{x1}$ (except v and w) (i.e., a Tree Edge Removal operation also preserves the two-node-connectivity of Ǵ).

Lemma 6 After removing (v, w), Ǵ contains a path $P_0$ between w and some ancestor t of v such that $P_0$ does not contain v and any node in $T_{x1}$.

Lemma 7 The tree edge removal operation preserves the two-node-connectivity of Ǵ.

Lemma 8 The resulting graph is two-node-connected.

In an additional embodiment of the present invention, the inventors discovered methods for the maximal node degree for UDGs by realizing the following property (proof omitted):

Lemma 9 If a UDG is two-node-connected, then the root of any DFS tree has only one child.

Which in turn led to the development of the following theorem:

Theorem 3: The final sub-graph is two-node-connected and its maximal node degree is 6 or less (proof omitted).

In the discussion above, DFS-based methods were presented for building a bounded degree subgraph G that satisfies two-edge-connectivity and two-node-connectivity. While a DFS-based approach possesses some fundamental properties that allow us to achieve the proved degree bounds, it tends to build deep trees where some nodes are many hops away from the root (gateway) which leads to delays and losses. Besides degree bound and two-connectivity, end-to-end delay and loss rate are also important performance metrics of wireless communication networks. To improve these performance metrics, it is often preferable to use short paths for communication. In accordance with the present invention, we evaluate the quality of a calculated mesh topology (i.e., subgraph) G in terms of the average length of the shortest paths (in hops) between a gateway and individual nodes. For each node v, we use lv to denote the length of the shortest path between v and the gateway in the calculated subgraph G (i.e., hop distance). Our objective is thus to minimize $L_G = \Sigma v \in v$ lv, where $L_G$ may be the hop distance between a gateway and node.

In accordance with an embodiment of the present invention, without exceeding the achieved degree bound, it is still possible to decrease $L_G$ by augmenting a calculated subgraph G with additional links. In a so-called "greedy" manner, we iteratively add additional shortcut links to G to minimize $L_G$ in the augmented subgraph. In each iteration, we augment G with one additional link such that the maximal node degree in G is not increased while $L_G$ is maximally decreased. For simplicity, we refer to this optimization as augmentation. Augmentation can be applied on any subgraph G we build to improve a network's delay and loss rate performance.

We have assumed until now that the mesh network contains only a single gateway. In accordance with additional embodiments of the invention, the methods set forth above may be applied to networks that contain multiple gateways. The DFS-based methods as well as the BFS-tree methods do not rely on each node being a gateway, and hence seamlessly accommodate multiple gateways. However, the augmentation process needs slight modification. Specifically, in the presence of multiple gateways, lv is defined to be the shortest path distance from node v to the closest gateway. Based on this definition of lv, the definition of $L_G$ and our objective of optimization remain the same. In each iteration, we still augment G with one additional link such that the maximal node degree in G is not increased while $L_G$ is maximally decreased.

So far we have implicitly assumed that the full graph possesses the requested two-connectivity. In the presence of multiple gateways, if the full graph is not two-edge-connected (two-node-connected), we may still be able to find a subgraph where each non-gateway node has two edge-disjoint (node-disjoint) paths to some gateway(s). The solution is to augment the full graph with a "super gateway" node, which is adjacent to all gateways but not adjacent to any other node. If the augmented full graph is two-edge-connected (two-node-connected), we can apply BBA and SRA as usual to build a two-edge-connected (two-node-connected) subgraph of the augmented full graph. In the subgraph, each non-gateway node v has two edge-disjoint (node-disjoint) paths $P_1$ and $P_2$ to the super gateway. Since the super gateway is only adjacent to gateways, its predecessors on $P_1$ and $P_2$ are both gateways, denoted by $g_1$ and $g_2$. Thus, removing the super gateway from $P_1$ and $P_2$ gives us two edge-disjoint (node-disjoint) paths from v to $g_1$ and $g_2$. As to node degree, it is not hard to verify that after removing the super gateway, the degree bound analysis of BBA and SRA apply as well. Therefore, the degree bounds of UDGs still hold.

Though the discussion above has focused on methods for determining the number of directional antennas needed to maintain the operation of an NWNM during a node or link failure, it should be understood that each of the methods discussed above may be executed by a controller or the like which is responsible for determining the topology of an NWMN, for example. Such a controller may include hardware, software and/or firmware that, when connected together and/or executed, carries out the SRA, BBA and other methods discussed above. When software and firmware is used, they may be stored on, or made a part of, a computer readable medium or the like. Such a controller may be further connected to one or more other network devices, such as databases, wireless mesh routers, etc., in order to receive and send information necessary to execute the inventive methods discussed above.

Yet further, once the number of antennas for a given NWMN network is determined, the present invention also provides for the configuration of a plurality of quasi-static routers using the links that are computed, or that remain, after the inventive methods have been executed. Each such router is connected to a determined number of directional antennas to preserve two-edge connectivity in the network during a link failure (e.g., at least ten) or to preserve two-node connectivity in the network during a node failure (e.g., at least six). One or more of these routers may be part of a ship or vehicle that is, in turn, part of an NWMN. Further, controllers provided by the present invention for executing the inventive methods may also be part of a ship or vehicle, or, optionally, part of a system that does not normally move.

In addition to developing the BBA and SRA methods, the inventors also completed evaluations of these methods. More specifically, the inventors conducted extensive simulations on thousands of randomly generated trial networks with different topologies, various numbers of nodes and single and multi-gateways. As a result, the inventors concluded that the SRA methods and related devices provided repeatable results and did indeed provide a more definitive way for network operators and the like to determine the number of directional antennas needed to maintain the operation of an NWMN when a link and/or node failure occurs. Such a determination, in effect, may help an operator reduce the number of antennas it may normally feel it needs at a node to a lower number, thus reducing its costs.

While the discussion set forth above has attempted to set forth some examples of the ideas underlying the present invention, a more complete scope of the present invention is set forth in the claims that follow.

We claim:

1. A robust, wireless mesh network comprising:
   a plurality of quasi-static routers wherein each of said quasi-static routers are connectable to a plurality of directional antennas providing broadband communications via point-to-point connections during a link or a node failure;
   a controller that:
   determines, when preserving a two-edge network connectivity during the link failure in the network of quasi-static routers, a first number of the plurality of directional antennas based on determining a first bounded node degree, unit disk graph subgraph providing two edge-disjoint paths between every pair of the plurality of quasi-static routers in the first subgraph, wherein the number of determined directional antennas is at least ten, and
   connecting the quasi-static routers with the first determined number of directional antennas; and
   determines, when preserving a two-node network connectivity during the node failure in the network of quasi-static routers, a subset of the plurality of directional antennas based on determining a second bounded node degree, unit disk graph subgraph providing two router-disjoint paths between every pair of the quasi-static routers in the second subgraph, wherein the subset of determined directional antennas is at least six, and
   connecting the quasi-static routers with the subset of directional antennas.

2. The network in claim 1 wherein the network comprises a nomadic wireless mesh network.

3. The network in claim 1 wherein each router is part of a ship or vehicle.

* * * * *